United States Patent

Engholdt

[15] 3,652,861

[45] Mar. 28, 1972

[54] APPARATUS FOR DETECTING THE HARDNESS LEVEL OF WATER

[72] Inventor: Richard K. Engholdt, Wauwatosa, Wis.

[73] Assignee: Erie Manufacturing Company, Milwaukee, Wis.

[22] Filed: Apr. 1, 1969

[21] Appl. No.: 812,086

[52] U.S. Cl. ............................. 250/218, 250/210, 356/186, 23/253 R, 210/96
[51] Int. Cl. ....................................................... G01n 21/26
[58] Field of Search .................. 250/210, 218; 356/180, 181, 356/184–186, 39

[56] References Cited

UNITED STATES PATENTS

| 3,565,535 | 2/1971 | Monell | 356/39 |
| 3,529,893 | 9/1970 | Holle et al. | 250/210 X |
| 2,872,588 | 2/1959 | Barton, Jr. | 250/210 |
| 3,231,745 | 1/1966 | Doubek, Jr. et al. | 250/210 |

Primary Examiner—Walter Stolwein
Attorney—John W. Michael, Gerrit D. Foster, Bayard H. Michael, Paul R. Puerner, Joseph A. Gemignani, Andrew O. Riteris and Spencer B. Michael

[57] ABSTRACT

A control including a sampling means for periodically extracting a sample of water from a water system and a detection means for determining the hardness level of the sample. The sample is mixed with a reagent adapted to cause the sample to change color at a predetermined hardness level. The color of the sample is compared with that of a filter element by means of a pair of photoconductive cells connected in series in one leg of a bridge circuit. A difference in color between the sample and filter element indicating a hardness level above a give level will cause the bridge circuit to become unbalanced. A silicon controlled rectifier is connected across the bridge and will fire when the bridge becomes unbalanced causing a relay to be energized and thus provide power to initiate the regeneration cycle of a water softener apparatus.

5 Claims, 1 Drawing Figure

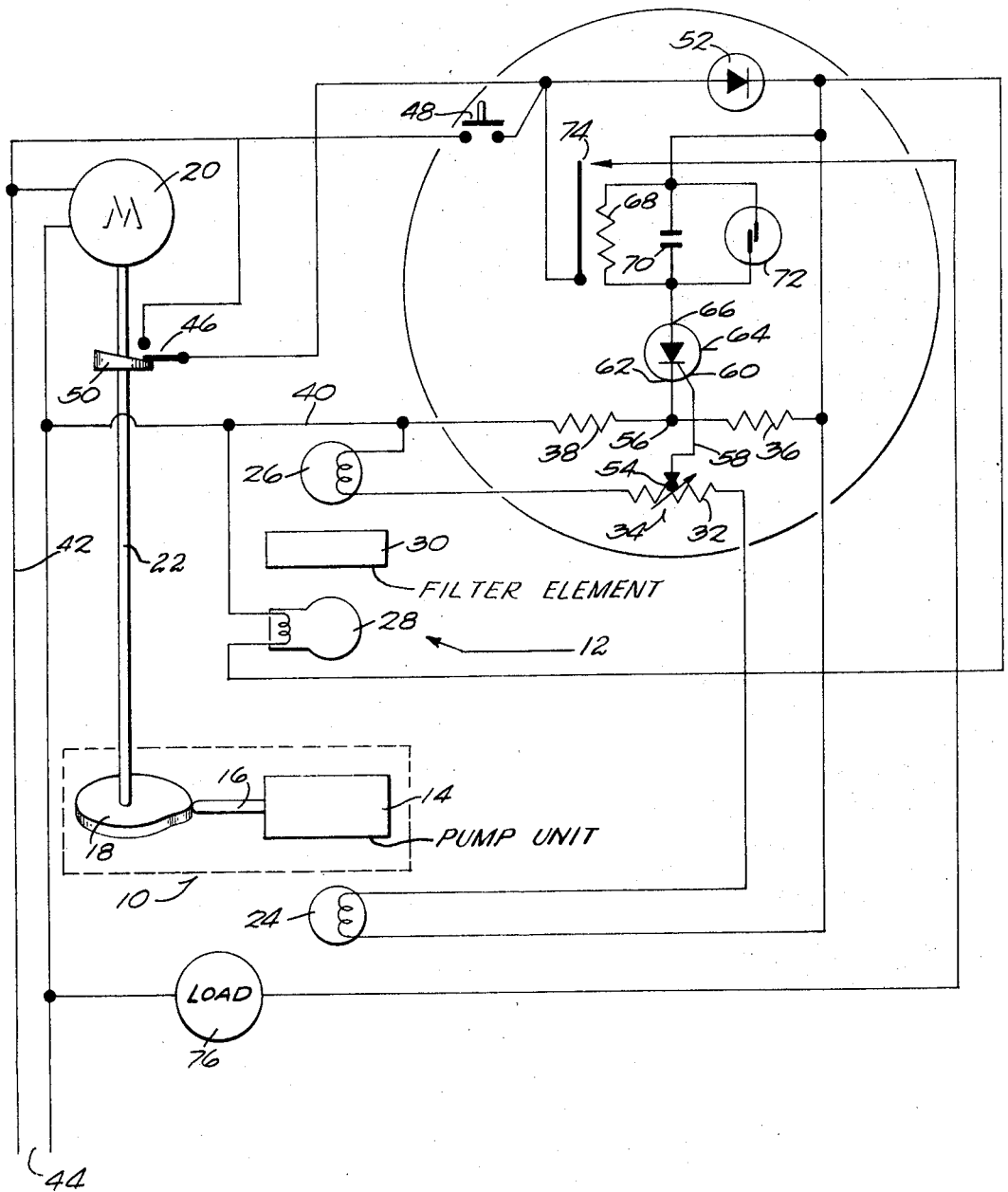

APPARATUS FOR DETECTING THE HARDNESS LEVEL OF WATER

BACKGROUND OF THE INVENTION

1. Field of the Invention.

This invention relates to a method and apparatus for detecting the hardness level of water and more particularly to automatic detection of the need for regeneration of an ion exchange water softener and the like and the establishment of a signal which may be employed to institute an automatic regeneration cycle.

2 Description of the Prior Art

Conventionally, timers have been employed to periodically regenerate the bed of an ion exchange water softener which results in regeneration irregardless of the actual condition of the bed. Abnormal and excessive use of water in the system may deplete the sodium ions from the bed prior to the time of regeneration. Periods when the softener is ineffective and hard water is passed through the system would then result. If on the other hand there is abnormal non-use of water in the system, the bed is regenerated prior to the depletion of the sodium ions in the bed resulting in a wasteful use of water and salt.

Some automatic controls have been proposed. For the most part they have employed some type of probe means for measuring the electrical resistance of the water in the system as an indication of hardness. The present invention overcomes the disadvantages of the straight timer approach and at the same time provides improved accuracy and greater simplicity over previous automatic controls.

SUMMARY OF INVENTION

A control for detecting the hardness level of water comprising a sampling means for periodically extracting a sample of water from the water system and mixing it with a reagent which is formulated to cause the sample to change color at a predetermined hardness level. The mixed sample is exposed to a detection means which includes a bridge circuit and a voltage- sensitive means connected to the bridge circuit for sensing an unbalanced condition in the bridge circuit. A pair of photo-conductive cells are connected in series in one leg of the bridge circuit. One of the cells is positioned to receive light which has passed through the sample and the other cell is positioned to receive light which has passed through a filter element corresponding in color to a sample which is below a predetermined hardness level. Thus when the hardness of the samples is below a preselected level it will take on the color of the filter element (when mixed with the reagent) and the light falling on both cells will be of substantially the same color and intensity and thus the bridge circuit will remain in a balanced condition. When the sample is above the preselected hardness level it will assume a different color from that of the filter element. When this happens the color and intensity of the light falling on the two cells will be different causing the bridge circuit to become unbalanced. The voltage-sensitive means will sense the unbalanced condition and produce a signal which may be used for example to initiate the regeneration cycle of a water softener apparatus.

DESCRIPTION OF THE DRAWINGS

The drawing shows a partially schematic view of a control embodying the present invention.

Referring to the drawing there is shown a schematic layout of the preferred embodiment of the control. The control is designed to initiate the regeneration cycle of a water softener in response to the degree of hardness of the water passing from the softener. In other words, the control is designed to initiate regeneration at the time regeneration is needed.

While the specific embodiment of the control disclosed herein is designed to detect the hardness level of water in a water system, it will be appreciated that it could be used for other purposes wherein the condition of the liquid to be tested is related to its color and/or shade.

The control is comprised of two basic units, namely a sampling means indicated generally by a reference numeral 10 and a detection means indicated generally by a reference numeral 12.

The sampling means may be of any suitable construction capable of periodically extracting a small volume of water from the water system, mixing the sample with a properly constituted reagent and then exposing the mixture to the detection means. As schematically shown in the drawing, the sampling means 10 is comprised of a sampling pump unit 14 having an actuating plunger 16 and a rotating cam member 18 adapted to actuate the plunger at periodic intervals of time. This may be accomplished by a timer motor 20 operatively connected to the cam 18 by means of a suitable gear train shown schematically as a shaft 22.

The detection means 12 includes a pair of photo-conductive cells 24 and 26 preferrably of the cadmium sulphide type, a light source 28 and a filter element 30. The components are arranged so that the light from lamp 28 which falls on cell 26 will first pass through filter element 30 and the light from the lamp which falls on cell 24 will first pass through the mixed water sample (in pump unit 14). In the preferred embodiment a filter element colored blue is selected to correspond to a sample which when mixed with the reagent will be of a matching blue color as long as such sample remains below a preselected degree of hardness.

Cells 24 and 26 are connected in series in one leg of a bridge circuit together with the resistance coil 32 of a potentiometer 34. The other leg of the bridge circuit is comprised of resistors 36 and 38. Power to the bridge circuit is supplied by conductors 40 and 42 connected to a source 44 of alternating current. The flow of current to the bridge is controlled by either switch 46 or switch 48 connected in parallel with each other. The operation of switch 46 is controlled by a timer driven cam member 50 and the operation of switch 48 is controlled manually for reasons explained hereinafter. The alternating current from source 44 is converted to a pulsating direct current at the bridge by means of a diode 52.

With the bridge in a balanced condition there will be no voltage difference between points 54 and 56 of the circuit shown in the drawing. In other words, the current flowing in the leg containing resistances 36 and 38 will cause a voltage drop to point 56 the same as the voltage drop to point 54 due to the current flow in the leg containing cells 24, 26 and resistance 32. Point 54 may be adjusted by means of the slide element 58 of potentiometer 34.

To sense an unbalanced condition in the bridge circuit, the gate 60 and anode 62 of a silicon controlled rectifier 64 are connected to points 54 and 56 of the bridge circuit as shown. Power to the cathode 66 of SCR 64 is supplied from diode 52 by a circuit which includes a relay coil 68, a smoothing capacitor 70 and a neon bulb 72 all connected in parallel with each other. Relay coil 68 controls the operation of a relay switch 74 which in turn controls the flow of electrical power to a load 76, which load in preferred embodiment is a water softener apparatus.

OPERATION

In operation, pump cam 18 driven by timer motor 20 will actuate sample pump unit 14 at a periodic time interval which for example could be once every 24 hours at a time of day when regeneration of the water softener would be most desirable, i.e. when water from the system would most likely not be required.

Actuation of pump unit 14 will cause a fresh sample of water to be extracted from the system at a point downstream of the softener. The sample will then be exposed in a manner to allow light from lamp 28 to pass therethrough and then be directed on to photo-conductive cell 24.

Power to the bridge circuit and to lamp 28 is supplied upon the closing of switch 46 by cam 50. The closing of switch 46 is timed to occur at about the time the sample is extracted from the system by the actuation of pump unit 14.

If the sample is below a preselected degree of hardness it will become a blue color when mixed with the reagent. Since the blue color of the filter element 30 is selected to be substantially identical to that of the "soft" sample, the bridge circuit will remain in a balanced condition. With the bridge circuit in a balanced condition the voltage at the gate 60 and anode 62 of SCR 64 will remain substantially the same and thus the SCR will not fire. With no current being passed by the SCR, relay coil 68 will remain unenergized.

Continued rotation of cam members 18 and 50 after obtaining a "soft" reading as described above will cause switch 46 to be opened and will cause pump unit to be actuated again to purge the sample from the unit.

At the end of a preset time interval such as 24 hours the pump unit will again be actuated to extract a fresh sample and switch 46 will again be closed to turn on lamp 28 and provide power to the bridge circuit. Assume now that the water in the system has risen above the preselected degree of hardness. In such case the "hard" sample when mixed with the reagent will turn a red color. Under such conditions the color and light intensity passing to cell 24 will differ from that arriving at cell 26 causing an unbalanced condition in the bridge circuit. While cells 24 and 26 can be chosen to be responsive to certain given light valves in the preferred embodiment shown in the drawing, the resistance of cell 24 will be substantially lowered when subjected to the light coming through the red sample.

The unbalancing of the bridge circuit as described above will produce a voltage differential between gate 60 and anode 62 of SCR 64 which in turn will cause the SCR to fire. The firing of SCR 64 will cause relay coil 68 to be energized thus closing relay switch 74. The closing of switch 74 will pass current to water softener regeneration control 76 to thereby initiate the regeneration cycle of the water softener unit.

The balance of the bridge circuit can be accurately adjusted by the following procedure. With a standard "blue" sample in pump unit 14, lamp 28 and the bridge circuit are energized by the manual closing of switch 48. Potentiometer 34 is then adjusted until neon bulb 72 is energized indicating an unbalanced condition in the bridge. The potentiometer is then readjusted until a point is reached wherein neon bulb 72 goes out indicating a balanced condition. The control is now properly set for operation.

It will be appreciated from the foregoing that by using a pair of matched photo-conductive cells as shown in the drawing, any variation in line voltage and/or deterioration of lamp 28 will be automatically compensated for by the system and no loss of accuracy will result.

Although but one embodiment of the present invention has been illustrated and described, it will be apparent to those skilled in the art that various changes and modifications may be made therein without departing from the spirit of the invention or from the scope of the appended claims.

The control of this invention could be usefully employed in any system wherein the condition of the sample was related to its color and/or shade. For example, it could be employed with appropriate chemicals and filters to determine the chlorine level of water in a swimming pool.

I claim:

1. A control for determining the condition of a liquid in a liquid system where the color and/or shade of the liquid is indicative of its condition comprising:
    a sampling means for periodically extracting a sample of liquid from the liquid system; and
    a detection means for determining the condition of the sample extracted by said sampling means, said detection means including a bridge circuit, a source of electricity for energizing said bridge circuit and a voltage-sensitive means connected to said bridge circuit and adapted to sense an unbalanced condition in said bridge circuit, said detection means further including a pair of photo-conductive cells connected in series in one leg of said bridge circuit, and a filter element corresponding to the sample when said sample is in a predetermined condition, one of said cells positioned to receive light which has passed through said sample and the other of said cells positioned to receive light which has passed through said filter element, and a source of light for directing light through said sample and filter element.

2. A control according to claim 1 in which said voltage sensitive means includes a silicon-controlled rectifier with its gate connected to one leg of said bridge circuit and its anode connected to the other leg of said bridge circuit.

3. A control according to claim 2 in which there is a potentiometer having a resistor and slide element with said slide element connected between the gate of said silicon controlled rectifier and said one leg of said bridge circuit and with the resistor of said potentiometer connected in series with said photo-conductive cells and between them.

4. A control according to claim 3 in which there is a relay means connected in series with said silicon controlled rectifier which will be energized when said silicon controlled rectifier fires as a result of an unbalanced condition in said bridge circuit.

5. A control according to claim 4 in which there is an indicator lamp means connected in parallel with said relay means.

* * * * *